UNITED STATES PATENT OFFICE.

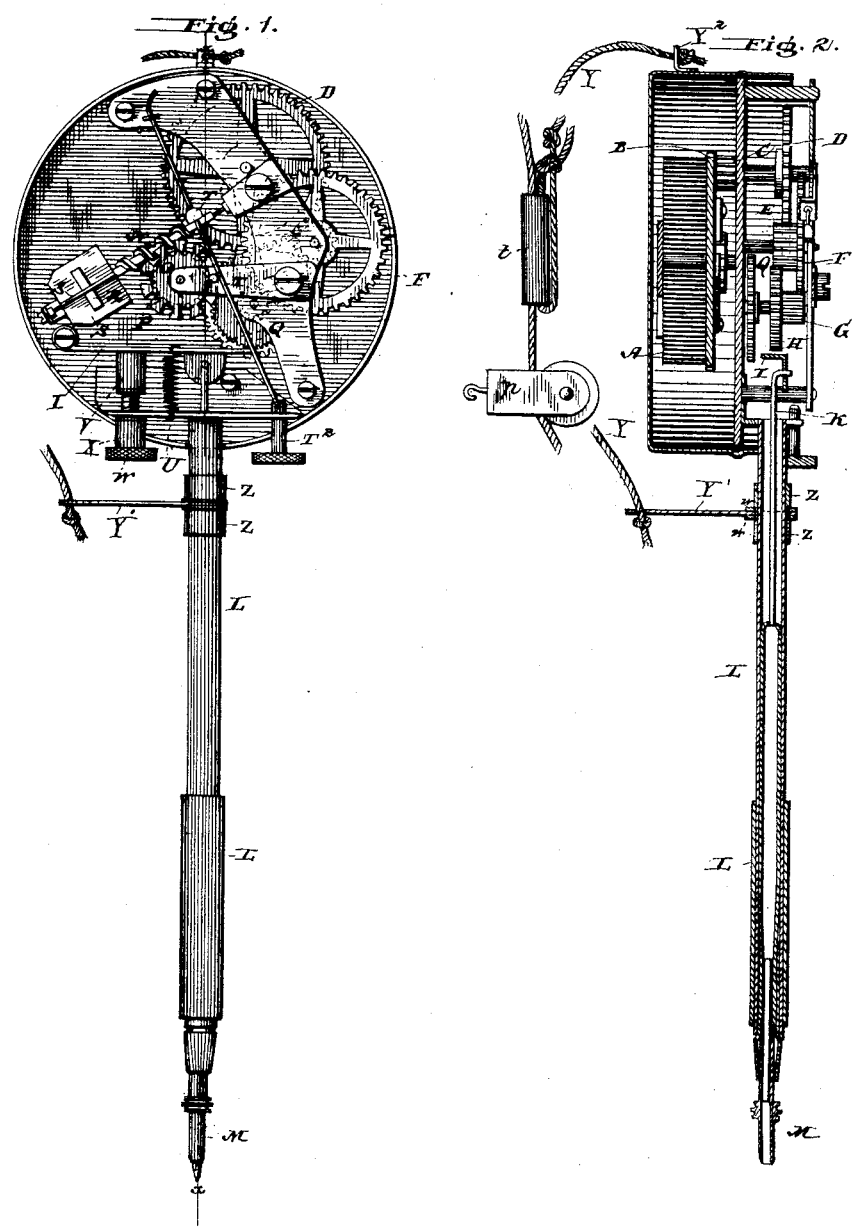

EMERSON A. GILBERT, OF MEADVILLE, PENNSYLVANIA.

AUTOMATIC RETOUCHER FOR PHOTOGRAPHIC NEGATIVES.

SPECIFICATION forming part of Letters Patent No. 264,146, dated September 12, 1882.

Application filed February 16, 1882. (No model.)

*To all whom it may concern:*

Be it known that I, EMERSON A. GILBERT, a citizen of the United States, and a resident of Meadville, Crawford county, Pennsylvania, have invented a new and useful Improvement in Automatic Retouchers for Photographic Negatives; and I do hereby declare the following to be a full and correct description of the same, reference being had to the accompanying drawings, in which—

Figure 1 is front view of my machine. Fig. 2 is a longitudinal section of the same on the line $x\ x$ of Fig. 1.

My invention consists of certain devices and combinations operated by clock-work for moving the pencil guided by the hand in retouching photographic negatives, all of which will be fully understood by the following description and claims.

The object of this invention is to produce rapid and uniform strokes of a pencil forming part of the machine, and being guided by the hand for the purpose of retouching photographic negative or crayon pictures.

In this machine the pencil is moved by clock-work, as follows: A suitable coiled spring, A, is the motive power. This spring gives motion to the main gear-wheel B, which engages with pinion C, thus transmitting motion to the second gear-wheel, D, which in turn gears into pinion E, transmitting motion to the third wheel, F, and this, engaging with pinion G, revolves the ratchet-wheel H, the teeth of which shake the pivoted bar or shaker I, as represented in Fig. 1.

To the shaker-bar I is attached the rod K, which extends through the pencil-holder L and moves the point M, which holds the lead.

For regulating the speed of the pencil or the number of strokes per minute a worm, N, is used in connection with worm-wheel O, the shaft of which carries pinion P, receiving motion from gear-wheel Q on the same shaft with ratchet-wheel H. This worm carries a balance-wheel, R, and also a fan-regulator, S, the wheel having radial slots for the insertion of the fans; also, the worm is provided with a brake consisting of a spring-wire, T, having a shoe, T', of india-rubber, and a tension-slide, T'', for working the brake.

The shaker I is provided with a spiral tension-spring, U, and a rubber spring, V, acting in opposite directions in order to regulate the force of the stroke of the stippling-point. The rubber spring gives an elastic instead of a dead stroke to the point. The adjusting thumb-screw W has a rubber jam-nut, X, placed between its outer extremity and the case, which, being in a state of compression, operates to prevent the screw from being moved by the jar of the machine when in operation.

The suspender or cord Y has a link, Y', in which the pencil-holder freely revolves, and also a pivoted link, Y'', and by means of these two links the suspender, while supporting the machine, does not interfere with the free turning of the machine in the hand of the operator. The link Y' is prevented from end-play by means of two pieces of rubber tubing, Z, which act as clamping or friction bands to hold the metallic washers $w$. A piece of rubber tubing, $t$, serves as a sliding clamp to fix the cord at any desired length. The suspender is provided with a pulley, $p$, having a swiveled hook in the usual manner.

The shaker-bar may be placed above the wheel, or at the side thereof, and a bevel-gear may be used in place of the worm and worm-wheel; and for crayon-pictures the stroke of the pencil should be slower, which may be easily accomplished by a ratchet having a less number of teeth.

Other modifications may be made without deviating from my invention.

Having thus described my invention, what I claim is—

1. The pencil-holder K L M, shaker-bar I, ratchet-wheels H P, worm-wheel O, worm, balance-wheel, and fan N R S, brake T', wire T, and tension-slide $T^2$, in combination with opposition-springs U V, adjusting-screw W, spring X, and operating clock-work, as shown and described.

2. The supporting devices consisting of link $Y^2$ and the link Y', adjustable rubber clamps Z Z, sliding clamp $t$, cord Y, and pulley $p$, as shown and described.

3. In combination with the clock mechanism and ratchet-wheels H P, the adjusting-springs U V and rubber jam-nut X, the shaker-bar S, brake T', wire T, tension-slide $T^2$, worm N, and wheel O, as shown and described.

The above specification of my said invention signed and witnessed at Washington this 16th day of February, A. D. 1882.

EMERSON A. GILBERT.

Witnesses:
DANIEL BREED,
FRED G. DIETERICH.